(12) United States Patent
Ur (10) Patent No.: US 9,865,088 B2
(45) Date of Patent: Jan. 9, 2018

(54) EVALUATION OF AUGMENTED REALITY SKINS

(71) Applicant: EMPIRE TECHNOLOGY DEVELOPMENT, LLC, Wilmington, DE (US)

(72) Inventor: Shmuel Ur, Galil (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 182 days.

(21) Appl. No.: 14/384,917

(22) PCT Filed: Jan. 31, 2014

(86) PCT No.: PCT/US2014/014223
§ 371 (c)(1),
(2) Date: Sep. 12, 2014

(87) PCT Pub. No.: WO2015/116186
PCT Pub. Date: Aug. 6, 2015

(65) Prior Publication Data
US 2016/0240006 A1    Aug. 18, 2016

(51) Int. Cl.
*G06T 19/00* (2011.01)
*G06T 19/20* (2011.01)
(Continued)

(52) U.S. Cl.
CPC ........ *G06T 19/006* (2013.01); *G06F 3/04842* (2013.01); *G06F 3/04845* (2013.01);
(Continued)

(58) Field of Classification Search
CPC combination set(s) only.
See application file for complete search history.

(56) References Cited

U.S. PATENT DOCUMENTS 6,672,961 B1   1/2004 Uzun
7,626,569 B2  12/2009 Lanier
(Continued)

FOREIGN PATENT DOCUMENTS

EP  1453002 A2  9/2004
GB  2488237 A   8/2012
(Continued)

OTHER PUBLICATIONS

"ARToolKit," accessed at https://web.archive.org/web/20131230032715/http://www.hitl.washington.edu/artoolkit/, accessed on Aug. 5, 2014, p. 1.
(Continued)

*Primary Examiner* — Wesner Sajous
(74) *Attorney, Agent, or Firm* — Moritt Hock & Hamroff LLP; Steven S. Rubin, Esq.

(57) ABSTRACT

Technologies are generally described for systems, devices and methods effective to evaluate an augmented reality skin. In some examples, when an augmented reality skin, when an augmented reality skin is executed in a full mode, the augmented reality skin may produce a set of augmented data. The set of augmented data, when rendered, may produce a first set of media attributes related to execution of the augmented reality skin in the full mode. The augmented reality skin may be executed in an evaluation mode to produce the set of augmented data and to produce a set of preview data. The set of preview data may be rendered to display a second set of media attributes related to a preview of the augmented reality skin. A preview image of the augmented reality skin may include the first set and second set of media attributes.

16 Claims, 5 Drawing Sheets

(51) Int. Cl.
- *G06F 3/048* (2013.01)
- *G06F 17/30* (2006.01)
- *G06T 11/00* (2006.01)
- *G06F 3/0484* (2013.01)

(52) U.S. Cl.
CPC .......... *G06F 17/3028* (2013.01); *G06T 11/00* (2013.01); *G06T 19/20* (2013.01); *G06T 2219/2024* (2013.01)

(56) References Cited

U.S. PATENT DOCUMENTS

| | | | |
|---|---|---|---|
| 8,190,939 | B2 | 5/2012 | Fields, Jr. et al. |
| 8,743,145 | B1 | 6/2014 | Price |
| 2004/0179037 | A1 | 9/2004 | Blattner et al. |
| 2005/0026685 | A1 | 2/2005 | Ruark et al. |
| 2005/0175101 | A1 | 8/2005 | Honda et al. |
| 2005/0286799 | A1 | 12/2005 | Huang et al. |
| 2007/0038944 | A1 | 2/2007 | Carignano et al. |
| 2007/0260984 | A1 | 11/2007 | Marks et al. |
| 2010/0302143 | A1 | 12/2010 | Spivack |
| 2011/0018903 | A1 | 1/2011 | Lapstun et al. |
| 2011/0055049 | A1 | 3/2011 | Harper et al. |
| 2011/0134108 | A1 | 6/2011 | Hertenstein |
| 2011/0138416 | A1 | 6/2011 | Kang et al. |
| 2011/0141254 | A1 | 6/2011 | Roebke et al. |
| 2011/0216089 | A1 | 9/2011 | Leung |
| 2011/0221659 | A1 | 9/2011 | King, III et al. |
| 2011/0258175 | A1* | 10/2011 | Kim .................. G06F 17/30864 707/709 |
| 2011/0279446 | A1* | 11/2011 | Castro .................... G01C 21/20 345/419 |
| 2011/0283223 | A1* | 11/2011 | Vaittinen ............ G01C 21/3647 715/781 |
| 2012/0001939 | A1 | 1/2012 | Sandberg |
| 2012/0019547 | A1 | 1/2012 | Tjen et al. |
| 2012/0092370 | A1 | 4/2012 | Oh et al. |
| 2012/0122529 | A1 | 5/2012 | Lyons |
| 2012/0240077 | A1* | 9/2012 | Vaittinen ............ G06F 3/04815 715/781 |
| 2012/0249741 | A1 | 10/2012 | Maciocci et al. |
| 2012/0262485 | A1 | 10/2012 | Raghoebardajal et al. |
| 2012/0327196 | A1 | 12/2012 | Ohba et al. |
| 2013/0016123 | A1* | 1/2013 | Skarulis ................... G09G 5/00 345/633 |
| 2013/0038633 | A1 | 2/2013 | Maggiore |
| 2013/0044129 | A1 | 2/2013 | Latta |
| 2013/0049976 | A1 | 2/2013 | Maggiore |
| 2013/0057544 | A1 | 3/2013 | Oh |
| 2013/0063487 | A1 | 3/2013 | Spiegel et al. |
| 2013/0093790 | A1 | 4/2013 | Jin |
| 2013/0106867 | A1 | 5/2013 | Joo et al. |
| 2013/0106900 | A1 | 5/2013 | Joo et al. |
| 2013/0128022 | A1 | 5/2013 | Bose et al. |
| 2013/0147837 | A1 | 6/2013 | Stroila |
| 2013/0293584 | A1 | 11/2013 | Anderson |
| 2014/0015987 | A1 | 1/2014 | Harple et al. |
| 2014/0173508 | A1 | 6/2014 | Berry et al. |
| 2014/0306982 | A1 | 10/2014 | Ollivier |
| 2015/0084989 | A1 | 3/2015 | Laughlin et al. |
| 2015/0097812 | A1 | 4/2015 | Huang et al. |
| 2015/0097862 | A1* | 4/2015 | Reisner-Kollmann ............ G06T 19/006 345/633 |
| 2015/0123966 | A1 | 5/2015 | Newman |
| 2016/0063671 | A1* | 3/2016 | Piippo .................... G06T 15/20 345/676 |

FOREIGN PATENT DOCUMENTS

| | | |
|---|---|---|
| JP | 2007216000 A | 8/2007 |
| KR | 20120070985 A | 7/2012 |
| WO | 2010024486 A1 | 3/2010 |
| WO | 2011146776 A1 | 11/2011 |
| WO | 2013023705 A1 | 2/2013 |
| WO | 2013049248 A2 | 4/2013 |

OTHER PUBLICATIONS

"Creator Program," accessed at https://web.archive.org/web/20130525200037/http://www.imvu.com/creators/about_the_program.php, accessed on Aug. 5, 2014, pp. 1-2.

"Glass Platform Developer Guidelines," accessed at https://web.archive.org/web/20131109171046/https://developers.google.com/glass/guidelines, Last modified Aug. 12, 2013, pp. 1-2.

"Inventory From Second Life Wiki," accessed at https://web.archive.org/web/20130907075454/http://wiki.secondlife.com/wiki/Inventory, Mar. 19, 2012, pp. 1-4.

Kokkevis, V., "GPU Accelerated Compositing in Chrome," Accessed at http://web.archive.org/web/20131210233722/http://www.chromium.org/developers/design-documents/gpu-accelerated-compositing-in-chrome, Accessed at Aug. 5, 2014, pp. 9.

"Pipeline (software)," Wikipedia, accessed at http://web.archive.org/web/20130123092009/http://en.wikipedia.org/wiki/Pipeline_(software), last modified on Jan. 3, 2013, pp. 1-5.

"Second Life Market Place," accessed at https://web.archive.org/web/20131104081053/https://marketplace.secondlife.com/products/search?search%5Bcategory_id%5D=33, Accessed on Aug. 5, 2013, pp. 1-10.

Carmigniani, J. and Furht, B. "Augmented Reality: An Overview," Handbook of Augmented Reality, 2011, pp. 3-46, Springer Science + Business Media.

Cobzas, D., et al., "Editing Real World Scenes: Augmented Reality with Image-based Rendering," in Proceedings of IEEE, 2003, pp. 291-292.

Columbus, L., "Gartner's Mobile App Store Forecast Predicts $26B in Sales, 102B Downloads in 2013," posted on Sep. 21, 2013, Accessed at http://www.forbes.com/sites/louiscolumbus/2013/09/21/gartners-mobile-app-store-forecast-predicts-26b-in-sales-102b-downloads-in-2013/?utm_campaign=techtwittersf&utm_source=twitter&utm_medium=social, Accessed on Aug. 5, 2014, pp. 6.

Gimeno, J. "An Advanced Authoring Tool for Augmented Reality Applications in Industry," In proceeding of: Actas de las XXIII Jornadas de Paralelismo, Sep. 21, 2012, pp. 6.

Huang, C., et al., "Directions for Peer-to-Peer based mobile pervasive augmented reality gaming," International Conference on Parallel and Distributed Systems, 2007, pp. 1-8, vol. 2.

Inger, Y., "Real-time Image Blending for Augmented Reality on Mobile Phones," Jun. 2, 2011, pp. 1-16.

International Search Report and Written Opinion for International Application No. PCT/US2014/014201, mailed on Jun. 26, 2014, 10 pages.

International Search Report and Written Opinion for International Application No. PCT/US2014/014207, mailed on Jun. 25, 2014, 11 pages.

International search report and Written Opinion for international application No. Pct/US2014/014212, mailed on Jun. 23, 2014, 9 pages.

International Search Report and Written Opinion for International Application No. PCT/US2014/014223, mailed on Jun. 26, 2014, 10 pages.

Law, A., "Photoshop Quick Tip: Finding Layers Quickly," accessed at https://web.archive.org/web/20131007002057/http://www.gomediazine.com/tutorials/photoshop-quick-tip-finding-layers-quickly/, Gomedia, Jul. 27, 2009, pp. 1-4.

Leetaru, K. H., "ShadowLight: an immersive environment for rapid prototyping and design," Proceedings of the SPIE, 2005, pp. 606-615, vol. 5664.

Lepetit, V., et al., "Real-Time Augmented Face," In Proc. International Symposium on Mixed and Augmented Reality, 2003, pp. 1-2.

Patterson, S., "Photoshop Layers Essential Power Shortcuts," accessed at https://web.archive.org/web/20131118090620/http://www.photoshopessentials.com/basics/layer-shortcuts/, accessed on Aug. 5, 2014, pp. 1-12.

Philg, "Legal and social issues due to Google Glass?," accessed at https://web.archive.org/web/20140615133037/http://blogs.law.harvard.edu/philg/2013/05/31/legal-and-social-issues-due-to-google-glass/, May 31, 2013, pp. 1-4.

(56) References Cited

OTHER PUBLICATIONS

Renukdas, P. et al., "Markerless Augmented Reality Android App for Interior Decoration," International Journal of Engineering Research & Technology (IJERT), 2013, pp. 1367-1373, vol. 2 Issue 4.
Rosten, E., et al., "Real-time Video Annotations for Augmented Reality," Advances in Visual Computing, Lecture Notes in Computer Science, 2005, pp. 294-302, vol. 3804.
Stankovic, S. and Rakkolainen, I., "Augmented Reality," SGN-5406 Virtual Reality, 2012, pp. 1-71.
Tennant, D., "How Augmented Reality Will Help Close the Skills Gap," accessed at http://web.archive.org/web/20130613042449/http://www.itbusinessedge.com/blogs/from-under-the-rug/how-augmented-reality-will-help-close-the-skills-gap.html, IT Business Edge, Jan. 9, 2013, pp. 1-8.
Wiltzuis, T., "Accelerated Rendering in Chrome," accessed at https://web.archive.org/web/20131129024711/http://www.html5rocks.com/en/tutorials/speed/layers, Mar. 11, 2013, pp. 1-9.
Extended European Search Report for European Patent Application No. 14881088, dated Jun. 6, 2017, pp. 10.
Extended European Search Report for European Patent Application No. 14881231, dated May 26, 2017, pp. 9.
Extended European Search Report for European Patent Application No. 14880509, dated Sep. 22, 2017, pp. 9.
Extended European Search Report for European Patent Application No. 14880818, dated Aug. 28, 2017, pp. 6.
Shapira, L., et al., "Layout Design for Augmented Reality Applications," Microsoft, accessed at https://www.microsoft.com/en-us/research/publication/layout-design-for-augmented-reality-applications/, Jan. 1, 2014, pp. 3.

\* cited by examiner

EVALUATION OF AUGMENTED REALITY SKINS

CROSS-REFERENCE TO RELATED APPLICATIONS

This application is the U.S. National Stage Entry under 35 U.S.C. §371 of International Application No. PCT/US14/14223, filed on Jan. 31, 2014, the entirety of which is hereby incorporated by reference. This application is related to Augmented Reality Skin Manager application Ser. No. 14/384,825, Augmented Reality Skin Evaluation application Ser. No. 14/384,870, and Subject Selected Augmented Reality Skin application Ser. No. 14/384,887.

BACKGROUND

Unless otherwise indicated herein, the materials described in this section are not prior art to the claims in this application and are not admitted to be prior art by inclusion in this section.

Augmented reality may use the real world as a background and add one or more layers of augmented information. A sensor may capture real image data relating to the real world. A processor may identify a reference point in the real image data, and may execute instructions to apply augmented reality data to the real image data based on the reference point. A user of an augmented reality device may control applications of augmented reality data to real image data.

SUMMARY

In one example, methods to evaluate augmented reality skins are generally described. The methods may include generating a preview image based on an augmented reality skin. The methods may include, by a processor, retrieving an augmented reality skin from a memory. The augmented reality skin, when executed in a full mode, may produce a set of augmented data. The set of augmented data, when rendered, may produce a first set of media attributes related to execution of the augmented reality skin. The methods may further include, by the processor, executing the augmented reality skin in an evaluation mode to produce the set of augmented data and to produce a set of preview data. The methods may further include, by the processor, rendering the set of preview data to display a second set of media attributes related to a preview of the augmented reality skin. The preview image of the augmented reality skin may include the first set and second set of media attributes.

In one example, an augmented reality device is generally described. The augmented reality device may include a processor. The augmented reality device may also include a display configured to be in communication with the processor. The augmented reality device may also include a memory configured to be in communication with the processor. The processor may be effective to retrieve an augmented reality skin from the memory. The augmented reality skin, when executed in a full mode, may produce a set of augmented data. The set of augmented data, when rendered, may produce a first set of media attributes related to execution of the augmented reality skin. The processor may also be effective to render the set of augmented data to produce the first set of media attributes. The processor may also be effective to execute the augmented reality skin in an evaluation mode to produce the set of augmented data and to produce a set of preview data. The processor may also be effective to render the set of preview data to produce a second set of media attributes related to a preview of the augmented reality skin. The preview image of the augmented reality skin may include the first set and second set of media attributes.

In one example, an augmented reality device is generally described. The augmented reality device may include a processor. The augmented reality device may also include a memory configured to be in communication with the processor. The augmented reality device may also include a display configured to be in communication with the processor. The processor may be effective to retrieve an augmented reality skin from the memory. The augmented reality skin, when executed in a full mode, may produce a set of augmented data. The set of augmented data, when rendered, may produce a first set of media attributes related to execution of the augmented reality skin. The processor may also be effective to execute the augmented reality skin in an evaluation mode to produce the set of augmented data and to produce a set of preview data. The processor may also be effective to render the set of preview data to produce a second set of media attributes related to a preview of the augmented reality skin on the display for a defined amount of time. The preview image of the augmented reality skin may include the rendered first set and rendered second set of media attributes.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the drawings, can be arranged, substituted, combined, separated, and designed in a wide variety of different configurations.

This disclosure is generally drawn to, inter alia, methods, apparatus, systems, devices, and computer program products related to evaluation of augmented reality skins.

Briefly stated, technologies are generally described for systems, devices and methods effective to evaluate augmented reality skins. In some examples, when an augmented reality skin is executed in a full mode, the augmented reality skin may produce a set of augmented data. The set of augmented data, when rendered, may produce a first set of media attributes related to execution of the augmented reality skin in the full mode. The augmented reality skin may be executed in an evaluation mode to produce the set of augmented data and to produce a set of preview data. The set of preview data may be rendered to display a second set of media attributes related to a preview of the augmented reality skin. A preview image of the augmented reality skin may include the first set and second set of media attributes.

Figure 1:
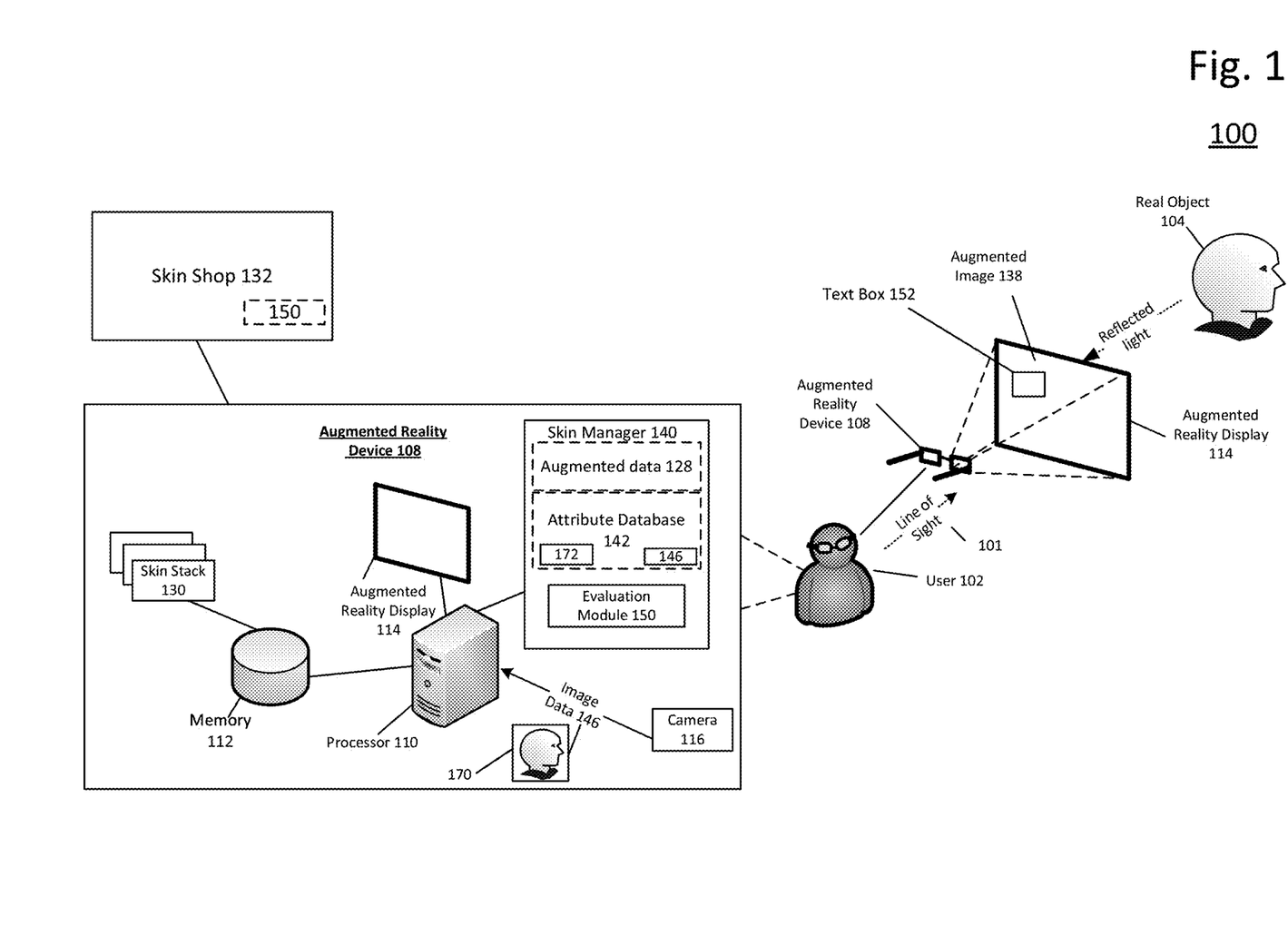
FIG. 1 illustrates an example system that can be utilized to implement evaluation of augmented reality skins.

FIG. 1 illustrates an example system 100 that can be utilized to implement evaluation of augmented reality skins, arranged in accordance with at least some embodiments described herein. As depicted, system 100 may include an augmented reality device 108. Augmented reality device 108 may include a processor 110, a memory 112, an augmented reality display 114, a skin manager 140 and/or a camera 116. Skin manager 140 may be implemented in hardware and/or implemented as instructions executable in hardware or some combination thereof. System 100 may include an evaluation module 150. Evaluation module 150 may also be implemented in hardware and/or implemented as instructions executable in hardware or some combination thereof. Evaluation module 150 may be located in a skin shop 132 or in skin manager 140. As will be discussed in further detail below, evaluation module 150 may be configured to facilitate evaluation of one or more augmented reality skins. In some examples, augmented reality device 108 may be a mobile phone, tablet computer, wearable device such as augmented reality glasses, or another computing device. Processor 110 may be configured to be in communication with memory 112, augmented reality display 114, skin manager 140 and/or camera 116.

Skin shop 132 may offer augmented reality skins for acquisition by a user 102 of augmented reality device 108. In an example, skin shop 132 may be accessible by augmented reality device 108 via a network. In an example, user 102 of augmented reality device 108 may retrieve, download, purchase or otherwise acquire one or more augmented reality skins from a skin shop 132. Augmented reality skins retrieved from skin shop 132 may be stored in a skin stack 130. Skin stack 130 may be stored in memory 112. Skin stack 130 may include one or more augmented reality skins awaiting execution by processor 110. Augmented reality skins in skin stack 130 may be executed in a particular order. As will be discussed in more detail below, augmented reality skins retrieved from skin shop 132 may be evaluated using evaluation module 150. Augmented reality skins may produce a set of augmented data when executed in a full mode. A full mode may be, for example, a non-trial or non-evaluation mode relating to execution of an augmented reality skin.

Camera 116 may capture light reflected from real object 104 and may generate image data 146 in response to the captured light. Skin manager 140 may receive image data 146. As shown in FIG. 1, if image data 146 were rendered on augmented reality display 114, the result would be image 170, which corresponds to real object 104. Skin manager 140 may be effective to perform one or more of the operations, described below, via processor 110 of augmented reality device 108.

Skin manager 140 may include an attribute database 142. Attribute database 142 may be a data structure configured to store metadata 172 related to image data 146. Skin manager 140 may identify features of objects found in image data 146. In some examples, features may include a human face, a cat, a car, etc. Skin manager 140 may store identified features of objects in attribute database 142. The features may be implicated by one or more augmented reality skins stored in skin stack 130. For example, skin manager 140 may store metadata 172 in attribute database 142. In an example, metadata 172 may be related to the presence of a feature in image data 146. Additionally, metadata 172 may be related to the location, color, position, size and/or identification of features found in image data 146. For example, metadata 172 may indicate that a feature "human head" is among the features present in image data 146. Metadata 172 may further indicate that data relating to the "human head" feature is stored at locations x1, y1 to x2, y2. A location of the feature "human head" may be a reference point identified by one or more skins in skin stack 130. Attribute database 142, and contents of attribute database 142, may be stored in memory 112 or in another memory. Image data 146 may also be stored in attribute database 142.

Skin manager 140 may be further configured to execute one or more augmented reality skins using image data 146. Skin manager 140 may modify portions of image data 146 to generate augmented data 128 based on the execution of one or more skins stored in memory 112. Augmented data 128 may be rendered on augmented reality display 114 to produce an augmented image 138. Augmented reality skins executed in full mode may produce augmented data that, when rendered, may produce a first set of media attributes related to execution of the augmented reality skin in the full mode. For example, the first set of media attributes may include display of a text box 152. Augmented reality skins may also be executed in an evaluation mode. Execution of an augmented reality skin in an evaluation mode may produce augmented data 128 as well as additional preview data. As will be discussed in further detail below, the preview data, when rendered, may display a second set of media attributes related to a preview of the augmented reality skin. Augmented data 128 may be rendered prior to, or contemporaneously with, the preview data.

In an example, skin manager 140 may sequentially execute augmented reality skins stored in skin stack 130. In another example, skin manager 140 may execute augmented reality skins in parallel, when the skins being executed do not implicate the same features of image data 146. Upon completion of execution of skins in skin stack 130, skin manager 140 may render augmented data 128 on augmented reality display 114 to produce augmented image 138. In some examples, skin manager 140 may execute one or more skins, but less than the total number of skins stored in memory 112, to generate intermediate augmented data.

Augmented reality skins may include instructions and/or skin data. Skin data may be image data, such as pixel values. Instructions in skins may be procedures to identify a reference point of a feature found in image data 146 and identified by metadata 172. Instructions in skins may also be procedures that, when executed, replace pixels associated with the feature with respective skin data. In an example, a skin may identify the feature "human head." Skin manager 140 may execute the skin and may determine whether a human head is present in image data 146 by analyzing metadata 172. In the example, when the feature "human head" exists in image data 146, the skin may be configured to replace pixels so that text box 152 is displayed on augmented reality display 114 which gives information about the human head.

For example, if a determination is made that the feature "human head" is among the features stored in attribute database 142, skin manager 140 may execute an augmented reality skin that implicates the feature "human head" to produce augmented data 128. Augmented data 128 may be produced by generating pixels associated with text box 152. Augmented data 128 may be rendered on augmented reality display 114 to produce augmented image 138. In the example, augmented image 138 may include text box 152 near a person's face. Text box 152 may identify the person and may give information about the person.

User 102 may view real object 104 along a line of sight 101 using augmented reality device 108, such as by wearing augmented reality device 108 or positioning augmented reality device 108 between an eye of user 102 and real object 104. User 102 may view augmented image 138 on augmented reality display 114 overlapping real object 104 along line of sight 101.

Figure 2:
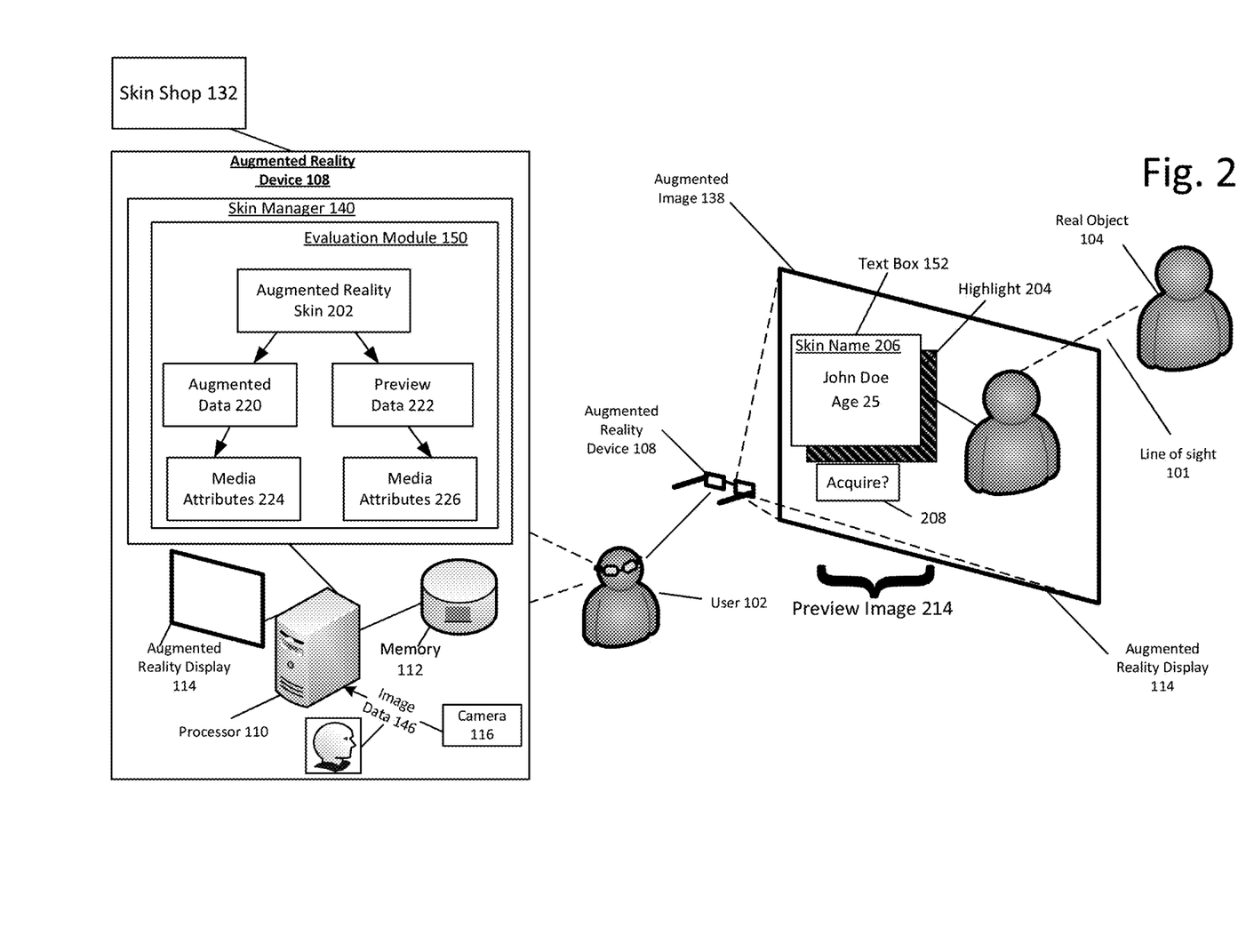
FIG. 2 depicts the example system of FIG. 1, illustrating additional details relating to evaluation of an augmented reality skin by the evaluation module.

FIG. 2 depicts the example system 100 of FIG. 1, illustrating additional details relating to evaluation of an augmented reality skin by the evaluation module, arranged in accordance with at least some embodiments described herein. Those components in FIG. 2 that are labeled identically to components of FIG. 1 will not be described again for the purposes of clarity and brevity.

User 102 may be interested in purchasing a skin from skin shop 132. When deciding whether or not to purchase, download or otherwise acquire a skin for execution and application via augmented reality device 108, user 102 may have the option of evaluating the skin with evaluation module 150.

In an example, user 102 may select an augmented reality skin 202 from skin shop 132. In an example, augmented reality skin 202 may be instructions and data that, when executed in a full mode, are configured to identify a person and display the name and age of the person in text box 152 on augmented reality display 114. Text box 152 may be displayed on augmented reality display 114 such that text box 152 appears to user 102 as being associated with a person.

Processor 110 may enable an evaluation mode for augmented reality skin 202. In some examples, skin manager 140 may output a prompt to user 102, such as on augmented reality display 114, and inquire whether augmented reality skin 202 should be applied in an evaluation mode. When the evaluation mode is enabled, evaluation module 150 may execute and apply augmented reality skin 202 based on instructions from user 102. In another example, augmented reality skin 202 may automatically be applied in the evaluation mode without a prompt to user 102.

Processor 110 may retrieve augmented reality skin 202 from memory 112. Execution of augmented reality skin 202 in the evaluation mode may produce a set of augmented data 220 and a set of preview data 222. Augmented data 220 may be data that, when rendered, produces a set of media attributes 224 associated with execution of augmented reality skin 202 in the full mode. In general, media attributes may be audio, video, still images, or tactile sensations which may be rendered in a perceptible form for user 102. In the current example depicted in FIG. 2, media attributes 224 may be a display of text box 152 that includes the name and age of a person corresponding to real object 104. Preview data 222 may be data that, when rendered, produces a set of media attributes 226 related to a preview of augmented reality skin 202. In the current example, media attributes 226 may include the display of highlight 204 around text box 152, the display of acquisition pane 208 and the display of skin name 206.

Augmented data 220 and preview data 222 may be rendered on augmented reality display 114 as preview image 214. Preview image 214 may include rendered media attributes 226 and rendered media attributes 224 associated with execution of augmented reality skin 202 in the evaluation mode. Media attributes 226 may include a skin name 206. Skin name 206 may be the name of augmented reality skin 202 or another identifier of augmented reality skin 202. Preview image 214 may further include highlight 204. Highlight 204 may be used to highlight or make apparent the effects of augmented reality skin 202 on augmented image 138. In an example, highlight 204 may be a brightly colored border around text box 152. Preview image 214 may further include acquisition pane 208. Acquisition pane 208 may include a button, text, symbol or other interface that facilitates acquisition of augmented reality skin 202. For example, a button within acquisition pane 208 may be selected by user 102 in order to download, purchase, retrieve or otherwise acquire or enable a full mode of augmented reality skin 202. In an example, acquisition pane 208 may include a link to skin shop 132. After the applicable interface in acquisition pane 208 is selected by user 102, augmented reality skin 202 may be acquired and enabled to be executed in full mode.

The display of media attributes 226 produced by augmented reality skins placed in evaluation mode may be temporally or otherwise limited. The evaluation mode may be enabled for a defined amount of time. For example, processor 110 may start a timer the first time a feature in real object 104 implicates an augmented reality skin and media attributes 226 are rendered. At the expiration of the timer, an evaluation mode of augmented reality skin 202 may expire.

In another example, preview images generated by a skin under evaluation may be shown for a specified and/or defined number of frames or for a specified and/or defined amount of time. Evaluation module 150 may generate a prompt for user 102, such as on augmented reality display 114, indicating that evaluation mode for a skin may expire. For example, user 102 may receive a notification that evaluation mode of augmented reality skin 202 will expire in one hour and that any corresponding preview images that may be produced by executing the augmented reality skin will similarly expire. The prompt may request user 102 to select the applicable interface in acquisition pane 208 prior to the expiration of the augmented reality skin.

Among other benefits, a system in accordance with the present disclosure may allow a user to see the effects of an augmented reality skin prior to full acquisition. In some situations when many augmented skins are being executed, it may be unclear what effects a particular augmented reality skin may have upon the composite image displayed to the user. Further, as augmented reality skins may be applied to reference points in the real world, a user may not appreciate the implications of application of a skin until the user sees the real world reference point. Highlighting or otherwise identifying the effect of a skin may help a user to assess whether or not the user desires to acquire the skin. Additionally, the evaluation mode may be a useful marketing tool for augmented reality skin developers. Allowing users to try out augmented reality skins before full purchase may boost sales.

Figure 3:
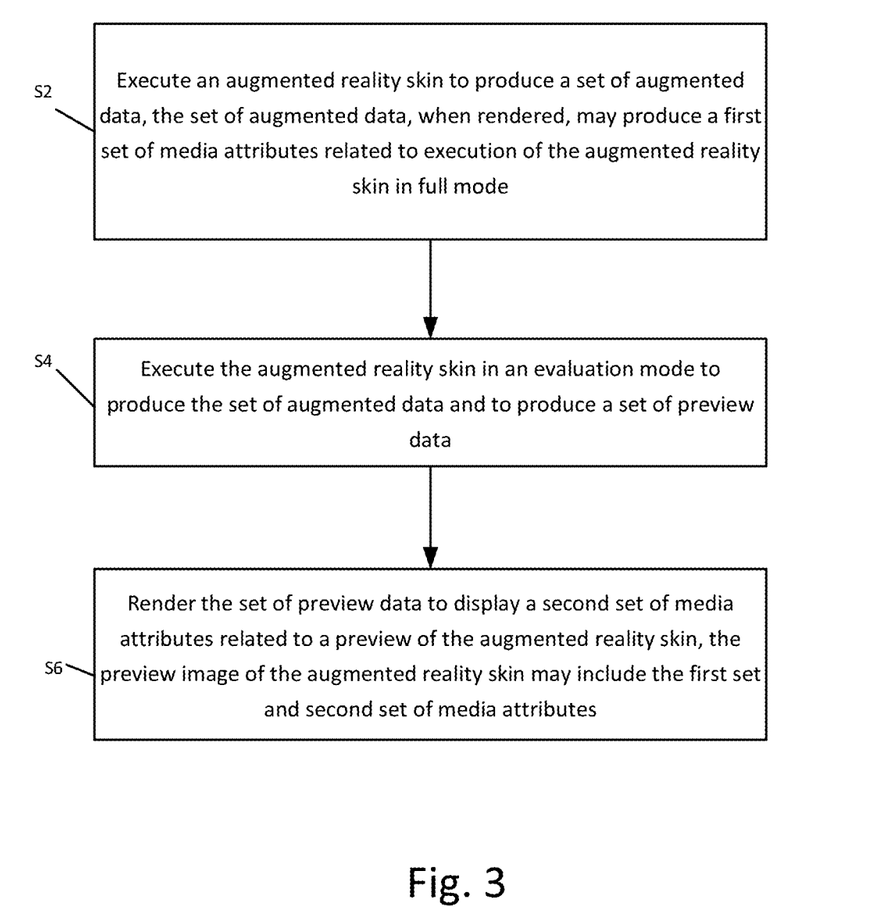
FIG. 3 depicts a flow diagram of an example process for implementing evaluation of augmented reality skins.

FIG. 3 depicts a flow diagram of an example process for implementing evaluation of augmented reality skins, arranged in accordance with at least some embodiments described herein. In some examples, the process in FIG. 3 could be implemented using system 100 discussed above and could be used to implement evaluation of augmented reality skins. An example process may include one or more operations, actions, or functions as illustrated by one or more of blocks S2, S4, and/or S6, etc. Although illustrated as discrete blocks, various blocks may be divided into additional blocks, combined into fewer blocks, or eliminated, depending on the particular implementation. Blocks may be supplemented with additional blocks representing other operations, actions, or functions. The process in FIG. 3 may be used by an augmented reality device that includes a skin manager, such as skin manager 140 described above. The skin manager may be configured in communication with an evaluation module.

Processing may begin at block S2, "Execute an augmented reality skin to produce a set of augmented data, wherein the set of augmented data, when rendered, may produce a first set of media attributes related to execution of the augmented reality skin in full mode." At block S2, an augmented reality skin may be retrieved and executed to produce a set of augmented data. The set of augmented data, when rendered, may produce a first set of media attributes related to execution of the augmented reality skin in full mode.

Processing may continue from block S2 to block S4, "Execute the augmented reality skin in an evaluation mode to produce the set of augmented data and to produce a set of preview data." At block S4, the augmented reality skin may be executed in an evaluation mode. Execution of the augmented reality skin in the evaluation mode may produce the set of augmented data and may produce a set of preview data.

Processing may continue from block S4 to block S6, "Render the set of preview data to display a second set of media attributes related to a preview of the augmented reality skin, the preview image of the augmented reality skin may include the first set and second set of media attributes." At block S6, the set of preview data may be rendered to display a second set of media attributes. The second set of media attributes may be related to a preview of the augmented reality skin. The preview image of the augmented reality skin may include the first set and second set of media attributes. The second set of media attributes may include a name of the augmented reality skin and may include a highlight around the first set of media attributes. The second set of media attributes may include a display of an acquisition pane. The acquisition pane may include an interface that facilitates acquisition of the augmented reality skin. A selection may be received in the acquisition pane. Execution of the augmented reality skin in full mode may be enabled in response to the selection in the acquisition pane.

The preview image of the augmented reality skin may be displayed for a defined number of frames. The preview image of the augmented reality skin may be displayed for a defined amount of time. Prior to rendering the set of preview data, the set of augmented data may be rendered to produce the first set of media attributes. A prompt may be generated on the display to request a selection in the acquisition pane at a time prior to expiration of the defined amount of time.

Figure 4:
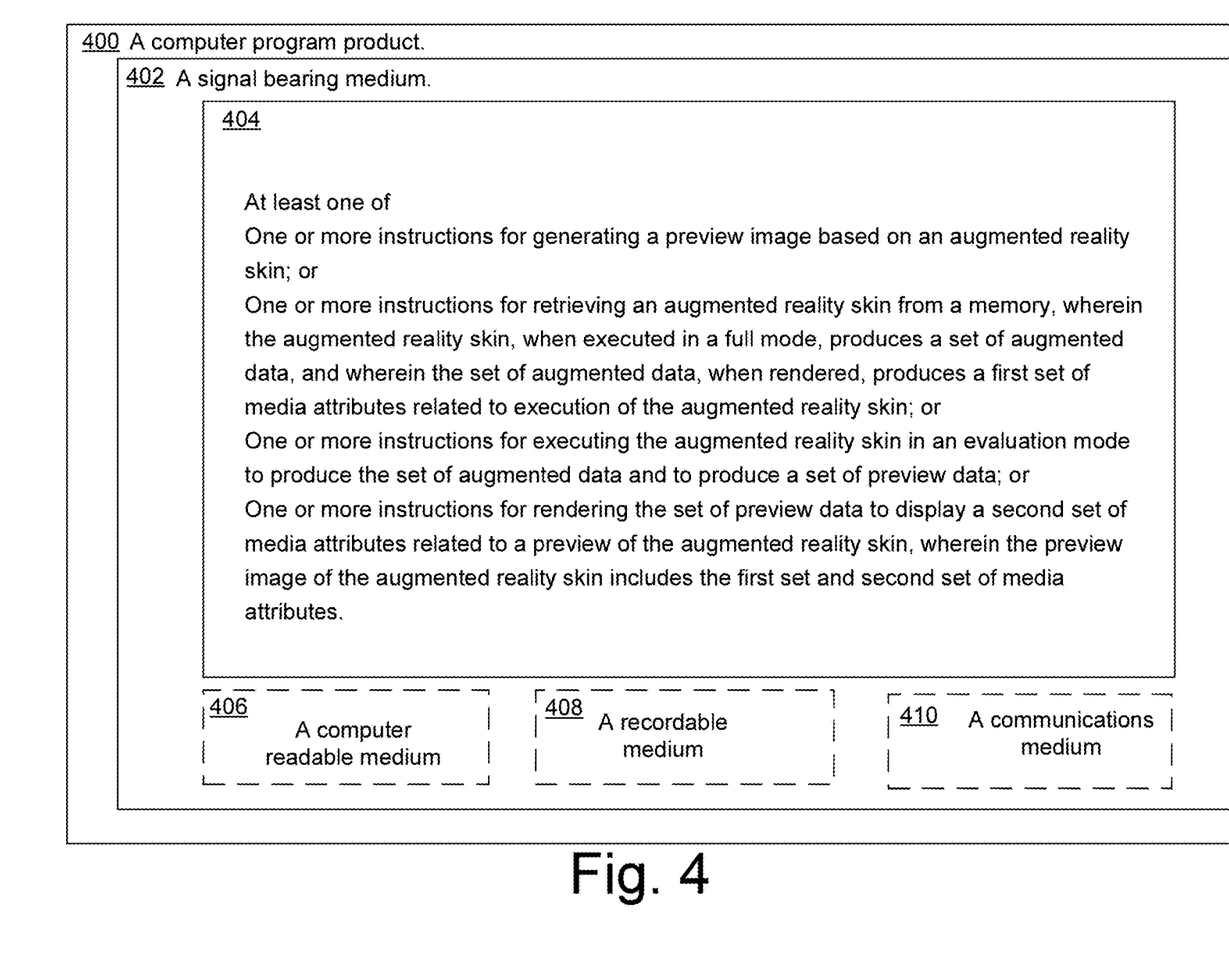
FIG. 4 illustrates an example computer program product that can be utilized to implement evaluation of augmented reality skins.

FIG. 4 illustrates an example computer program product 400 that can be utilized to implement evaluation of augmented reality skins arranged in accordance with at least some embodiments described herein. Computer program product 400 may include a signal bearing medium 402. Signal bearing medium 402 may include one or more instructions 404 that, in response to execution by, for example, a processor, may provide the functionality and features described above with respect to FIGS. 1-3. Thus, for example, referring to system 100, skin manager 140 may undertake one or more of the blocks shown in FIG. 4 in response to instructions 404 conveyed to system 100 by signal bearing medium 402.

In some implementations, signal bearing medium 402 may encompass a computer-readable medium 406, such as, but not limited to, a hard disk drive (HDD), a compact disc (CD), a digital video disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communication link, a wireless communication link, etc.). Thus, for example, computer program product 400 may be conveyed to one or more modules of the system 100 by an RF signal bearing medium 402, where the signal bearing medium 402 is conveyed by a wireless communications medium 410 (e.g., a wireless communications medium conforming with the IEEE 802.11 standard).

Figure 5:
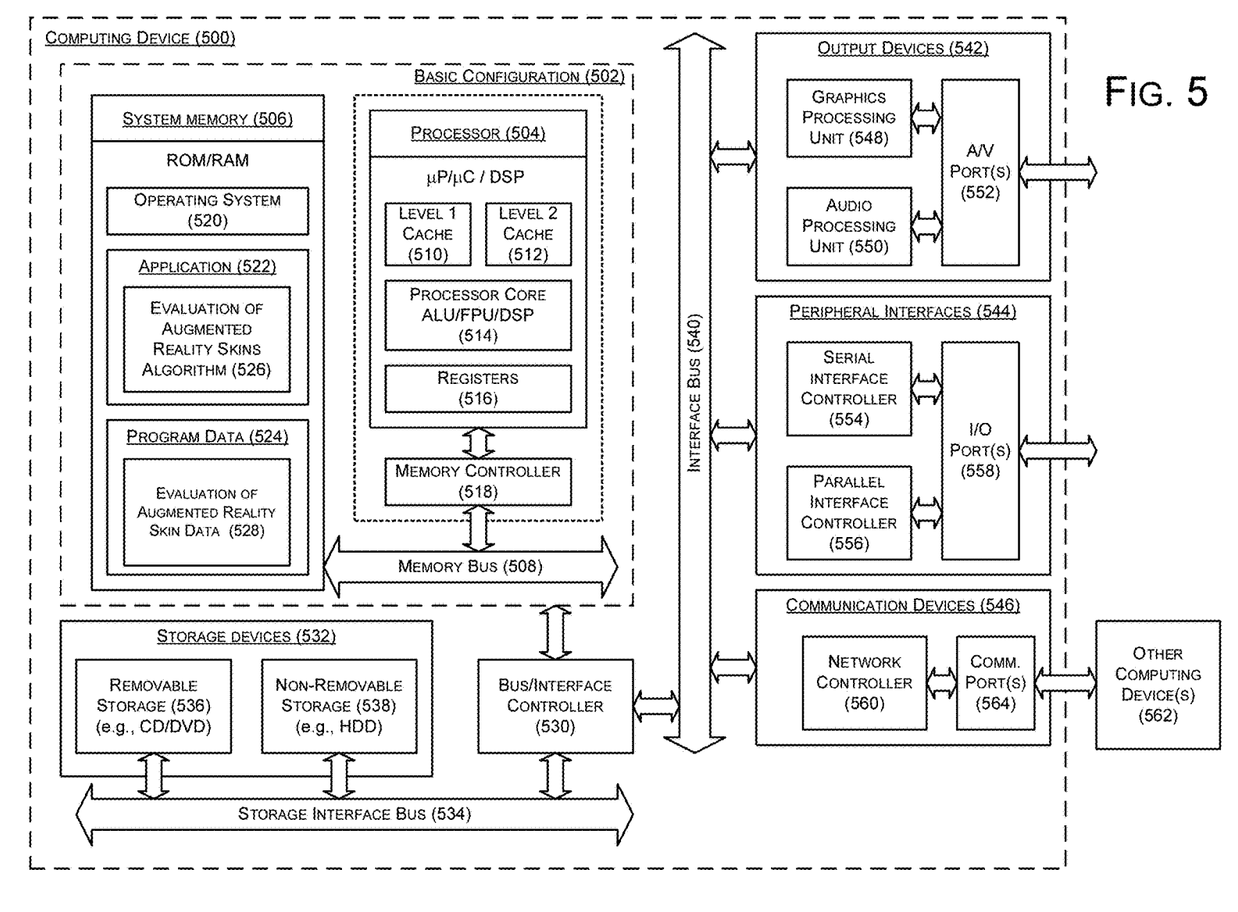
FIG. 5 is a block diagram illustrating an example computing device that is arranged to implement evaluation of augmented reality skins, all arranged according to at least some embodiments described herein.

FIG. 5 is a block diagram illustrating an example computing device 500 that is arranged to implement evaluation of augmented reality skins, arranged in accordance with at least some embodiments described herein. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (μP), a microcontroller (μC), a digital signal processor (DSP), or any combination thereof. Processor 504 may include one or more levels of caching, such as a level one cache 510 and a level two cache 512, a processor core 514, and registers 516. An example processor core 514 may include an arithmetic logic unit (ALU), a floating point unit (FPU), a digital signal processing core (DSP core), or any combination thereof. An example memory controller 518 may also be used with processor 504, or in some implementations, memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, one or more programmable circuits 566 and program data 524. Application 522 may include evaluation of augmented reality skins algorithm 526 that is arranged to perform the functions and operations as described herein including those described with respect to FIGS. 1-4 in connection with system 100. Program data 524 may include evaluation of augmented reality skin data 528 that may be useful to implement evaluation of augmented reality skins as is described herein. In some embodiments, application 522 may be arranged to operate with program data 524 in cooperation with operating system 520 such that evaluation of augmented reality skins may be provided. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDDs), optical disk drives such as compact disk (CD) drives or digital versatile disk (DVDs) drives, solid state drives (SSDs), and tape drives to name a few. Example computer storage media may include volatile and non-volatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a wearable device such as eye-glasses, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, will be apparent from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method to generate a preview image based on an augmented reality skin, the method comprising, by a processor:
   retrieving the augmented reality skin from a memory, wherein the augmented reality skin, when executed in a full mode, produces a set of augmented data, and wherein the set of augmented data, when rendered, produces a first set of media attributes related to execution of the augmented reality skin;
   executing the augmented reality skin in an evaluation mode to produce the set of augmented data and to produce a set of augmented reality preview data; and
   rendering the set of augmented reality preview data to display a second set of preview media attributes, different from the first set of media attributes, and related to a preview of the augmented reality skin, wherein the evaluation mode is enabled for a defined amount of time, wherein the defined amount of time is measured from a time at which the second set of preview media attributes is displayed by the processor in the evaluation mode, and wherein the preview image of the augmented reality skin includes the first set of media attributes related to execution of the augmented reality skin, and the second set of preview media attributes related to the preview of the augmented reality skin.

2. The method of claim 1, wherein the second set of preview media attributes includes a name of the augmented reality skin.

3. The method of claim 1, wherein the second set of preview media attributes includes a highlight around the first set of media attributes.

4. The method of claim 1, further comprising, by the processor, displaying the preview image of the augmented reality skin for a defined number of frames.

5. The method of claim 1, further comprising, prior to rendering the set of augmented reality preview data, rendering the set of augmented data to produce the first set of media attributes.

6. The method of claim 1, wherein the second set of preview media attributes includes a display of an acquisition pane, and wherein the acquisition pane comprises an interface that facilitates acquisition of the augmented reality skin.

7. The method of claim 6, further comprising:
   receiving a selection in the acquisition pane; and
   enabling execution of the augmented reality skin in the full mode in response to the selection in the acquisition pane.

8. An augmented reality device, comprising:
   a processor;
   a display configured to be in communication with the processor; and
   a memory configured to be in communication with the processor,
      wherein the processor is configured to:
         retrieve an augmented reality skin from the memory, wherein the augmented reality skin, when executed in a full mode, produces a set of augmented data;
         render the set of augmented data to produce a first set of media attributes;
         execute the augmented reality skin in an evaluation mode to produce the set of augmented data and to produce a set of preview data; and
         render the set of preview data to produce a second set of preview media attributes, different from the first set of media attributes, and related to a preview of the augmented reality skin, wherein the evaluation mode is enabled for a defined amount of time, wherein the defined amount of time is measured from a time at which the second set of preview media attributes is displayed by the processor in the evaluation mode, and wherein a preview image of the augmented reality skin includes the first set of media attributes related to execution of the augmented reality skin, and the second set of preview media attributes related to the preview of the augmented reality skin.

9. The augmented reality device of claim 8, wherein the second set of preview media attributes includes a name of the augmented reality skin.

10. The augmented reality device of claim 8, wherein the second set of preview media attributes includes a highlight around the first set of media attributes.

11. The augmented reality device of claim 8, wherein the processor is further configured to cause a display of the preview image of the augmented reality skin for a defined number of frames.

12. The augmented reality device of claim 8, wherein the second set of preview media attributes includes a display of an acquisition pane, and wherein the acquisition pane comprises an interface that facilitates acquisition of the augmented reality skin.

13. The augmented reality device of claim 12, wherein the processor is further configured to:
receive a selection in the acquisition pane; and
enable execution of the augmented reality skin in the full mode in response to the selection in the acquisition pane.

14. An augmented reality device, comprising:
a processor;
a memory configured to be in communication with the processor; and
a display configured to be in communication with the processor, wherein the processor is configured to:
retrieve an augmented reality skin from the memory, wherein the augmented reality skin, when executed in a full mode, produces a set of augmented data, and wherein the set of augmented data, when rendered, produces a first set of media attributes related to execution of the augmented reality skin;
execute the augmented reality skin in an evaluation mode to produce the set of augmented data and to produce a set of preview data;
render the set of preview data to produce a second set of preview media attributes, different from the first set of media attributes, and related to a preview of the augmented reality skin on the display for a defined amount of time, wherein a preview image of the augmented reality skin includes the rendered first set of media attributes related to execution of the augmented reality skin, and the rendered second set of preview media attributes related to the preview of the augmented reality skin, wherein the second set of preview media attributes includes a display of an acquisition pane, and wherein the acquisition pane comprises an interface that facilitates acquisition of the augmented reality skin;
receive a selection in the acquisition pane;
enable execution of the augmented reality skin in the full mode in response to the selection in the acquisition pane; and
generate a prompt on the display to request the selection in the acquisition pane prior to an expiration of the evaluation mode.

15. The augmented reality device of claim 14, wherein the processor is further configured to render the set of augmented data to display the first set of media attributes on the display.

16. The augmented reality device of claim 14, wherein the second set of preview media attributes includes a name of the augmented reality skin or a highlight around the first set of media attributes.

* * * * *

UNITED STATES PATENT AND TRADEMARK OFFICE
CERTIFICATE OF CORRECTION

PATENT NO. : 9,865,088 B2  
APPLICATION NO. : 14/384917  
DATED : January 9, 2018  
INVENTOR(S) : Ur Page 1 of 1

It is certified that error appears in the above-identified patent and that said Letters Patent is hereby corrected as shown below:

On the Title Page

In Item (71), under "Applicant", in Column 1, Lines 3-5, delete "EMPIRE TECHNOLOGY DEVELOPMENT, LLC, Wilmington, DE (US)" and insert -- EMPIRE TECHNOLOGY DEVELOPMENT LLC, Wilmington, DE (US) --, therefor.

In the Specification

In Column 2, Line 64, delete "hereof In" and insert -- hereof. In --, therefor.

In Column 11, Line 12, delete "(e.g., "system having" and insert -- (e.g., "a system having --, therefor.

Signed and Sealed this  
Twenty-seventh Day of March, 2018

Andrei Iancu  
*Director of the United States Patent and Trademark Office*